Patented Aug. 15, 1939

2,169,737

UNITED STATES PATENT OFFICE 2,169,737

DIAZO-AMINO COMPOUND AND METHOD OF MAKING SAME

Jean G. Kern, East Aurora, N. Y., assignor to National Aniline and Chemical Company, Inc., New York, N. Y., a corporation of New York No Drawing. Application August 11, 1936, Serial No. 95,482

7 Claims. (Cl. 260—140)

This application relates to a new class of chemical compounds and to the production and use of such compounds. It is in part a continuation of my application Serial No. 691,819, filed October 2, 1933.

In application Serial No. 95,481, filed on the same date herewith, I have described and claimed a new class of chemical compounds, namely the alkylolamino-methylene sulfurous acids and sulfites of the general formula:

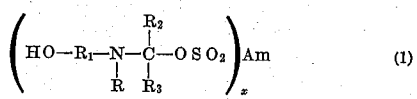

wherein R represents hydrogen or an alkyl or cycloalkyl group or the group HO—$R_1$; $R_1$ represents an alkyl, cyclo-alkyl, hydroxy-alkyl, or polyhydroxy-alkyl group; $R_2$ represents hydrogen or an alkyl group; $R_3$ represents hydrogen or an alkyl group or, but only when $R_2$ represents H, an aryl group; Am represents hydrogen or a metal atom, and $x$ is an integer which equals the valence of Am, which compounds may be prepared by reacting aldehyde or ketone metal bisulfites with alkylolamines. As pointed out in that application, such compounds may be employed for numerous purposes.

In accordance with the invention of the present application I have found that alkylolamino-methylene sulfurous acids and sulfites of the type defined by the above general formula wherein R represents hydrogen, may be reacted with aromatic diazonium salts to yield soluble diazo-amino compounds. The reaction takes place readily at ordinary temperature merely by bringing a solution of the diazonium salt into intimate contact with a solution of the alkylolamino-methylene sulfite. Preferably the reaction is carried out at a low temperature, say around 0° C., and the solution is maintained neutral or acid during the reaction. Since the diazonium chlorides are acid in reaction, the desired acidity may be maintained during the reaction merely by adding the alkylolamino-methylene sulfite to the diazonium salt. This reaction may be illustrated by the following equation:

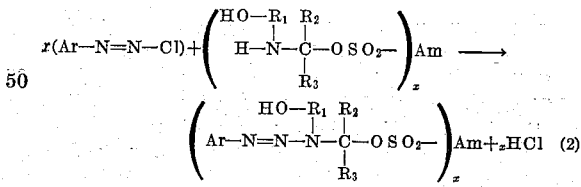

wherein Ar represents the aromatic residue of a diazotizable aromatic amine and $R_1$, $R_2$, $R_3$, Am, and $x$ have the values assigned under Formula 1. In the case of diazonium salts containing more than one diazo group, each diazo group will be joined to an amino group and it will be understood that the meaning of Ar in the above formula is intended to include such groups. In the case of the sulfites of hydrogen or a monovalent metal, the reaction of tetrazonium salts may be represented by the equation:

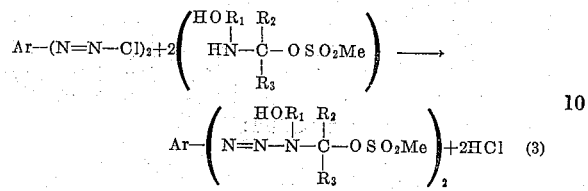

wherein $R_1$, $R_2$, and $R_3$ have the values previously assigned, and Me represents H or a monovalent metal.

Examples of suitable diazonium salts are those derived from aromatic amines of the benzene, naphthalene, anthraquinone, and carbozole series, for instance, the diazonium salts of metachloraniline, 2-methyl-5-chlor-aniline, 2,5-dichlor-aniline, 2,5-dichlor-4-methylaniline, 2-methoxy-5-chlor-aniline, 2-methyl-4-nitro-aniline, 3-nitro-4-methyl-aniline, 2-amino-4-methoxy-5-benzoylamino-1-chlorbenzene, 4-chlor-4'-amino-2',5'-diethoxy-azobenzene, dianisidine, benzidine, 2,5-dimethoxy-4-(4'-methylbenzene-1'- sulfonylamino)-aniline, 4,4'-diamino-diphenylamine, 4-amino-4'-methoxy-diphenylamine, 4-amino-3-methoxy-diphenylamine, 2-methoxy-5-chlor-4-benzoylamino-aniline, 2-methyl-5-methoxy-4-benzoylamino-aniline, 2,5-dimethoxy-4-benzoylamino-aniline, 2-chlor-5-methoxy-4-benzoylamino-aniline. The diazo-amino compounds of this invention are particularly valuable dye intermediates, especially in compositions containing alkali-metal salts of coupling components, since they exhibit an increased stability over the simpler forms of the diazo compounds, as for example the nitrosamines, from which they are produced.

The diazo-amino-methylene sulfites of the present invention also are very powerful insecticides. Examples of compounds particularly suitable for this purpose are the N(2,5-dichlor-benzene diazo)-ethanol-amino-methylene sulfites of zinc, copper, mercury, tin, iron, and cobalt. These heavy metal salts may be represented by the following probable general formula:

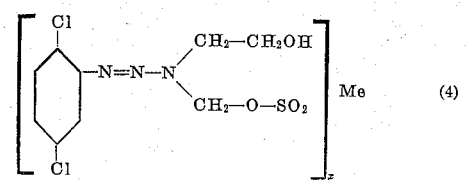

where Me is the heavy metal and $x$ is an integer equal to the valence of the metal.

The following specific examples illustrate the preparation of the diazo-amino compounds of the present invention. Quantities are expressed in parts by weight.

*Example 1.*—127½ parts of meta-chloraniline are diazotized in the usual way at a temperature of about 0° C., and mineral acid present is neutralized with an excess of sodium acetate. Then 177 parts of ethanolamino-methylene sulfite of sodium are dissolved in about 500 parts water, the solution is cooled to about 0° C. and added slowly to the cold energetically agitated diazonium solution. A very fine, yellow crystalline precipitate begins to appear. The reaction liquor is then slowly neutralized with either caustic soda or sodium carbonate while its temperature is kept between about 0° C. and about 5° C., the neutralized mass is agitated for some time (about 2 to 3 hours) until it ceases to show coupling ability when tested in the presence of an alkaline medium with sodium beta-naphtholate; the reaction mixture is then salted with either sodium chloride or sodium acetate and the precipitated product is separated as a cake by filtration and dried in vacuo at about 60° C. The final dry material is a yellow crystalline product of the following probable formula:

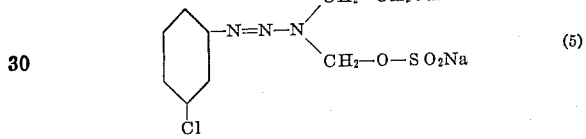

This product has excellent stability, is easily soluble in water, and may be admixed with a soluble salt of any developer, such as an arylide of 2,3-hydroxy-naphthoic acid, or an arylide of aceto-acetic acid, etc., without coupling therewith until submitted to an after-treatment with steam and acid. In this respect it is considerably superior to the similar diazo-amino compounds which can be made from meta-chlor-aniline and non-hydroxylated-amino-methylene sulfites; for example, it is much more stable than its corresponding compound, the N-(m-chlor-benzene-diazo)-N-ethyl-amino-methylene sulfite of sodium.

By the action of organic or inorganic acids, the diazo-amino compounds of the present invention in most cases are split into the free diazonium compounds and the original aldehyde or ketone from which the alkylolamino-methylene sulfite is derived, the sulfite radical being decomposed with the formation of sulfur dioxide. Since the resulting sulfur dioxide has a pronounced tendency to reduce the regenerated diazonium compound, and thus to hinder the production of the desired coupled products, I have found that it is advantageous to effect the cleavage and coupling in the presence of an oxidizing agent. In this manner the aforesaid reducing tendency may be substantially eliminated. Normal sodium chromate, sodium chlorate, hydrogen peroxide, the metal peroxides, hypochlorites, etc., are exceptionally suitable for this purpose. The addition of an oxidizing agent during cleaving and coupling is particularly advantageous in the case of printing or dyeing compositions which comprise diazo-amino compounds of the above type which are prepared from diazotized aromatic amines that are known to be slow coupling bases, for example, the nitro-bases and substitution derivatives thereof which otherwise cannot be employed to advantage without impairing the brilliance or shades of the resulting prints or dyeings. Very superior printings and dyeings are obtained with printing pastes or dyeing liquors which contain an added oxidizing agent and one or more of the diazo-amino compounds derived from alkylolamino-methylene sulfites as above described.

*Example 2.*—80 parts of a mixture composed of equimolar amounts of the diazo-amino compound obtained from 2,5-dichlor-aniline and ethanolaminomethylene sulfite of sodium, and the sodium salt of the 2,3-hydroxy-naphthoic acid toluidide are dissolved in 300 parts hot water. Alcohol or any other suitable solvent may be added or used in admixture. This solution is thickened with 500 parts of a neutral starch-tragacanth printing paste; then 40 parts of sodium chromate ($Na_2CrO_4 \cdot 10H_2O$) dissolved in 80 parts of water are added. The goods are printed, dried, and are aged or steamed and developed in an acid bath (1% acetic acid, ½% formic acid, 2½% Glauber's salt) or they may be directly developed in an acid ager or steamer. A very brilliant scarlet print is thus obtained which is much more brilliant than the corresponding scarlet prints which are obtained without the use of the sodium chromate.

The above printing method is of general use with any diazo-amino-methylene (including substituted methylene) sulfite herein described, and the sodium chromate may be replaced by any suitable oxidizing agent such as sodium chlorate, etc. The use of various mixtures of these stabilized aromatic diazonium bodies with various coupling components permits the production of a large variety of fast and brilliant shades. Any of the usual coupling components may be employed in accordance with the procedures of the preceding examples; thus, 2,3-hydroxy-naphthoic acid toluidide, other hydroxy- or amino-naphthoic acid arylides, aceto-acetic-acid arylides, carbazole carboxylic acid arylides, hydroxy-anthracene or -anthraquinone carboxylic acid arylides, etc., may be employed. The mixtures of diazo-amino compound and coupling component have excellent stability and may be stored without coupling. The dye may be developed by treating fibers printed with the composition with steam and acid.

*Example 3.*—The 2-chlor-benzene-diazo-ethanol-amino-methylene-sodium-sulfite as obtained according to Example 1 may also be prepared in the following manner:

127½ parts of meta-chlor-aniline-hydrochloride are diazotized in the usual way at a temperature of about 0° C. and all mineral acid neutralized with an excess of sodium acetate. Then 61 parts of mono-ethanolamine dissolved in about 400 parts of water and cooled to a temperature of about 0° C. are added very slowly and while stirring energetically, to the above diazo solution.

The reaction liquor is then slowly neutralized with either caustic soda or sodium carbonate, keeping the temperature between about 0° C. and about 5° C., whereupon after a short while a very fine yellow crystalline precipitate appears and the mother liquor ceases to show coupling ability when tested in the presence of alkaline medium with sodium-beta-naphtholate.

The product is then salted out with either sodium chloride or sodium acetate, separated as a cake by filtration, thoroughly washed with water and agitated in about 1000 parts water until a uniform suspension thereof is obtained.

At this stage the equivalent molecular amount of sodium-formaldehyde-bisulfite (134 parts) dissolved in approximately 500 parts water are added thereto, the reaction solution is slowly heated up to a temperature between 40° and 60° C., and thoroughly agitated, whereupon condensation occurs according to the following equation:

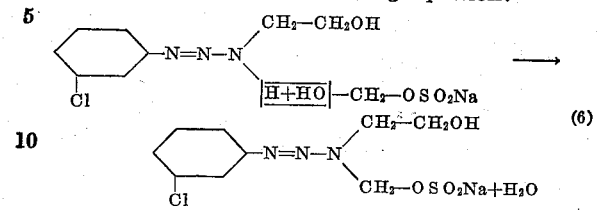 (6)

and the 2-chlor-benzene-diazo-ethanolamine passes slowly into solution. The N-(m-chlor-benzene-diazo)-N-ethanol-amino-methylene-sulfite of sodium product is thereupon salted out, separated as a cake by filtration, washed and dried in vacuo at 60° C.

The process which is illustrated in the foregoing Example 3 is applicable generally to the preparation of N - aryl - diazo - amino-N-alkylamino - methylene (including substituted methylene) sulfites. Thus, in the said example ethanolamine may be replaced by its equivalent in mols of another primary amine, for example methylamine, ethylamine, etc. Similarly the formaldehyde bisulfite reagent may be replaced by condensation products obtainable from an aldehyde or ketone undergoing the bisulfite reaction; in particular, it may be replaced by such compounds as benzaldehyde-bisulfite or ortho-sulfo-benzaldehyde-bisulfite or 2,5-disulfo-benzaldehyde-bisulfite, etc., which yield diazo-amino compounds characterized by great solubility and by the ease with which they cleave in the presence of acid.

Similar products may be prepared by the condensation of aromatic diazonium salts with ethanolamino-metylene-sulfite of sodium, mono-ethanolamino - ethylidene - potassium - sulfite, mono-ethanolamino-isopropylidene-sodium-sulfite, mono-propanediol-amino - benzal - sodium-sulfite, propanediolamino-methylene-sulfite of sodium, and 2-cyclohexanolamino-methylene-sulfite of sodium.

The terms "alkyl" and "cycloalkyl" as used herein are intended to have their normal meaning designating hydrocarbon radicals of the chain and cyclic types respectively.

I claim:

1. Compounds of the general formula

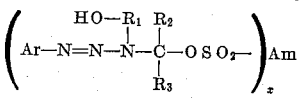

wherein Ar represents the aromatic residue of a diazotizable aromatic amine; $R_1$ represents an alkyl, cyclo-alkyl, hydroxy-alkyl, or polyhydroxy-alkyl group; $R_2$ represents hydrogen or an alkyl group; $R_3$ represents hydrogen or an alkyl group or, when $R_2$ represents H, an aryl group; Am represents hydrogen or a metalatom; and $x$ is an integer equal to the valence of Am.

2. Compounds of the general formula:

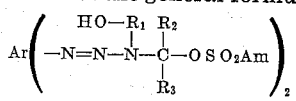

wherein Ar represents the aromatic residue of a diazotizable aromatic diamine; $R_1$ represents an alkyl, cyclo-alkyl, hydroxy-alkyl, or polyhydroxy-alkyl group; $R_2$ represents hydrogen or an alkyl group; $R_3$ represents hydrogen or an alkyl group or, when $R_2$ represents H, an aryl group; and Am represents hydrogen or an alkali-metal.

3. Compounds of the general formula:

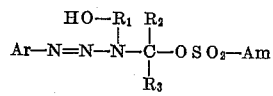

wherein Ar represents the aromatic residue of a diazotizable aromatic mono-amine; $R_1$ represents an alkyl, cyclo-alkyl, hydroxy-alkyl, or polyhydroxy-alkyl group; $R_2$ represents hydrogen or an alkyl group; $R_3$ represents hydrogen or an alkyl group or, when $R_2$ represents H, an aryl group; and Am represents hydrogen or an alkali-metal.

4. The method of producing the products of claim 1, which comprises admixing in neutral or acid solution an aromatic diazonium salt with a compound of the formula:

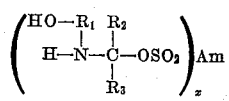

wherein $R_1$ represents an alkyl, cyclo-alkyl, hydroxy-alkyl, or polyhydroxy alkyl group; $R_2$ represents hydrogen or an alkyl group; $R_3$ represents hydrogen or an alkyl group or, when $R_2$ represents H, an aryl group; Am represents hydrogen or a metal atom; and $x$ is an integer which equals the valence of Am.

5. The method of producing the products of claim 2, which comprises admixing in neutral or acid solution in a molar ratio of about 1:2 an aromatic tetrazonium salt and a compound of the formula:

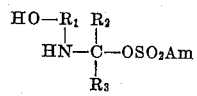

wherein $R_1$ represents an alkyl, cyclo-alkyl, hydroxy-alkyl, or polyhydroxy-alkyl group; $R_2$ represents hydrogen or an alkyl group; $R_3$ represents hydrogen or an alkyl group or, when $R_2$ represents H, an aryl group; and Am represents hydrogen or an alkali-metal.

6. The process of forming a stable diazo compound which comprises reacting a product of the group consisting of aldehyde-metal bisulfites and ketone-metal-bisulfites with an alkylolamine so as to form a condensation product, and agitating the condensation product with an aromatic-diazo compound.

7. The method of producing the products of claim 3, which comprises admixing in neutral or acid solution in about equimolar ratio an aromatic diazonium salt with a compound of the formula:

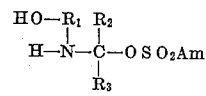

wherein $R_1$ represents an alkyl, cyclo-alkyl, hydroxyalkyl, or polyhydroxy-alkyl group; $R_2$ represents hydrogen or an alkyl group; $R_3$ represents hydrogen or an alkyl group or, when $R_2$ represents H, an aryl group; and Am represents hydrogen or an alkali-metal.

JEAN G. KERN.